(12) United States Patent
Marshall et al.

(10) Patent No.: US 8,601,815 B2
(45) Date of Patent: Dec. 10, 2013

(54) METHOD FOR GENERATING, TRANSMITTING AND RECEIVING POWER

(75) Inventors: Bruce C. Marshall, Santa Paula, CA (US); Aravinda Kar, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 937 days.

(21) Appl. No.: 12/422,414

(22) Filed: Apr. 13, 2009

(65) Prior Publication Data

US 2009/0206697 A1   Aug. 20, 2009

Related U.S. Application Data

(63) Continuation-in-part of application No. 11/890,735, filed on Aug. 6, 2007, now Pat. No. 8,001,784.

(60) Provisional application No. 61/044,814, filed on Apr. 14, 2008, provisional application No. 61/044,630, filed on Apr. 14, 2008.

(51) Int. Cl.
| *F01K 27/00* | (2006.01) |
| *F01K 23/00* | (2006.01) |
| *F01B 21/04* | (2006.01) |
| *H01L 25/00* | (2006.01) |
| *F03G 7/00* | (2006.01) |

(52) U.S. Cl.
USPC .............. 60/643; 60/698; 60/641.1; 136/243

(58) Field of Classification Search
USPC ................ 385/88, 89, 125, 133; 398/171
See application file for complete search history.

(56) References Cited

U.S. PATENT DOCUMENTS

| 2,141,322 | A |   | 12/1938 | Thompson |
| 4,045,119 | A | * | 8/1977 | Eastgate ................. 385/125 |
| 4,281,280 | A |   | 7/1981 | Richards |
| 4,454,865 | A | * | 6/1984 | Tammen ................. 126/640 |
| 4,496,211 | A |   | 1/1985 | Daniel |
| 4,623,869 | A |   | 11/1986 | Marubashi |
| 4,692,683 | A | * | 9/1987 | Lalmond ................ 322/2 R |
| 4,710,977 | A |   | 12/1987 | Lemelson |
| 4,737,012 | A |   | 4/1988 | Murakami et al. |
| 4,805,987 | A | * | 2/1989 | Laakmann et al. ......... 385/125 |
| 4,841,946 | A |   | 6/1989 | Marks |
| 4,905,309 | A | * | 2/1990 | Maisonneuve et al. ..... 398/168 |
| 4,913,505 | A | * | 4/1990 | Levy ..................... 385/147 |
| H0000855 | H | * | 12/1990 | Otto et al. ................ 385/36 |
| 5,005,944 | A |   | 4/1991 | Laakmann et al. |
| 5,065,025 | A |   | 11/1991 | Doyle |
| 5,099,144 | A |   | 3/1992 | Sai |
| 5,500,054 | A | * | 3/1996 | Goldstein ................ 136/253 |
| 5,567,471 | A | * | 10/1996 | Harrington et al. ........ 427/163.2 |
| 5,664,035 | A |   | 9/1997 | Tsuji et al. |
| 5,716,442 | A | * | 2/1998 | Fertig .................... 136/246 |
| 6,302,100 | B1 |   | 10/2001 | Vandenberg |
| 7,169,006 | B2 | * | 1/2007 | Tavkhelidze et al. ......... 445/67 |
| 7,359,647 | B1 |   | 4/2008 | Faria et al. |
| 2007/0240757 | A1 |   | 10/2007 | Ren et al. |
| 2009/0002137 | A1 |   | 1/2009 | Radtke |

\* cited by examiner

*Primary Examiner* — Kenneth Bomberg
*Assistant Examiner* — Christopher Jetton
(74) *Attorney, Agent, or Firm* — Kelly & Kelley, LLP (57) ABSTRACT

A system and method for generating, transmitting and receiving power includes providing a source of non-optical power, such as thermal energy, which is converted into electricity. The non-optical power is converted into an optical power beam which is directed into a hollow pipe and transmitted along a length thereof. The hollow pipe may have an inner reflective surface, or lenses or collimators to direct the light therethrough. Upon exiting the hollow pipe, the optical power beam is converted into electricity.

19 Claims, 5 Drawing Sheets

METHOD FOR GENERATING, TRANSMITTING AND RECEIVING POWER

BACKGROUND OF THE INVENTION

The present invention generally relates to systems and methods for generating and transmitting electrical power. More particularly, the present invention relates to systems and methods for generating and transmitting electrical power by converting electrical energy into optical energy, which is then transported in a light carrier, and subsequently converted again into electrical energy.

Power generation is essentially unchanged from the late 1800s, and only moderate improvements have been made in the intervening century. In almost every application, some energy, such as heat or the energy of falling water, is harnessed to turn a turbine which then spins the armature of a generator, and the electrical energy derived is then directed into conductive wires, for distribution.

In many cases, an energy source is used to heat water, and heated water or steam is passed through a generator to create electricity. In other cases, such as hydroelectric dams, a source of water and gravity is used to power the turbines. In yet other cases, such as wind-generated power or solar power, the electricity is generated by movement of the air or capturing sunlight respectively. In any event, it is conventional to harness and transport the electrical energy by means of metallic wires, typically copper or copper-based cables.

With the growing world economy, copper has become quite expensive. Moreover, these cable transmission lines are difficult to build, and typically include towers, intermediate power stations, etc. which increase the overall cost and complexity of the power grid. Moreover, these cables are susceptible to damage due to wind, heat from fires, terrorist attacks and the like. There is also a fair amount of loss of electrical energy as it is transmitted over long distances. The system disclosed herein offers a considerable reduction in easement requirement compared with overhead power lines, and it completely eliminates the need to consider the effects of electromagnetic fields on the environment during the design phase.

Accordingly there is a continuing need for a new and novel method for the generation and transmission of electrical power. The systems and methods of the present invention are particularly adapted for use in association with a system that recovers superheated fluids from deep-ocean hydrothermal vents, and then uses the superheated fluids as a thermal energy source for generating electrical or optical energy. However, the systems and methods of the present invention can also be applicable to more conventional electricity generating systems, but instead used to replace their transmission systems at great cost advantages over conventional techniques for either undersea applications or for over land long-distance power generation and transmission as well.

SUMMARY OF THE INVENTION

The present invention is directed to a system and method for generating, transmitting and receiving power. In accordance with the present invention, a source of non-optical power is provided and converted into an optical power beam. The optical power beam is directed into a hollow pipe and transmitted along a length thereof. The optical power beam is then converted into electricity at the opposite end of the pipe.

In a particularly preferred embodiment, a source of non-optical power comprises the step of providing a source of electricity. In one embodiment, thermal energy is converted into electricity using a first converter. Converting thermal energy into electricity may be done using magnetohydrodynamics. Such a magnetic hydrodynamic device or system includes passing a heated fluid having magnetic, conductive or charged particles through a magnetic field to generate the electricity. The electricity may also be generated by passing a fluid through an electromagnetic generator device. This may be done by heating fluid in a closed-loop system. Yet another alternative is to convert the thermal energy into electricity using a thermionic device. Such a device includes a first metal portion which is heated, and a second metal portion separated from the first metal portion by a vacuum and which has a temperature lower than the first metal portion. Any other practical conversion method could also be employed.

The non-optical power may be converted into an optical power beam using electricity to power a light generator. Such a light generator may comprise a light bulb, a laser, a light emitting diode, Tesla illumination, fluorescent, thermoluminescence, or any other practical method of generating light.

At least one of a light funnel, a wave guide, a light collimator, a beam combiner, or any other practical method of conducting light may be used to direct the optical power beam into an end of the hollow pipe. The hollow pipe may have an inner surface that reflects the optical power beam. Collimators or lenses may be disposed within the hollow pipe to direct the optical power beam along a length thereof.

In one embodiment of the invention, an optical data signal, typically generated by means of a data signal generator, is transmitted through the hollow pipe with the optical power beam. A fluid, such as a gas, may also be transferred through the hollow pipe with the optical power beam. However, in a particularly preferred embodiment, a vacuum is created within the hollow pipe so as to reduce dispersion and interference with the optical power beam.

Once the optical power beam reaches its destination, such as an opposite end of the hollow pipe, the optical power beam is converted into electricity. This can be done by means of photovoltaic cells. Alternatively, at least a portion of the optical power beam is passed through a magnetic field and onto a metal plate, utilizing the Photo-electric Effect. Yet another alternative is to use the optical power beam to heat a fluid, and subsequently pass the fluid through an electromagnetic generator or a magnetohydrodynamic device. The light may also be focused through magnifying lenses to create intense heat which can be used with conventional steam generation methods. In yet another alternative embodiment, the optical power beam is directed onto a rectenna to create electricity.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a new and novel method and system for the generation and transmission of electrical power.

U.S. patent application Ser. No. 11/890,735 to Bruce C. Marshall discloses a hydrothermal energy and deep-sea resource recovery system and related methods. This application is incorporated by reference in its entirety herein. In this application, Mr. Marshall, a co-inventor of the present application, discloses systems and methods for capturing superheated water from deep-sea hydrothermal vents and bringing the superheated water to the surface, such as to an oil rig platform or the like. The superheated water is then used to create electricity, among other things. This electricity is then transmitted to an on-shore receiving station. The system and method involves a renewable energy source without the need of burning fossil fuels, and the potential electricity generated from such systems is enormous.

Figure 1:
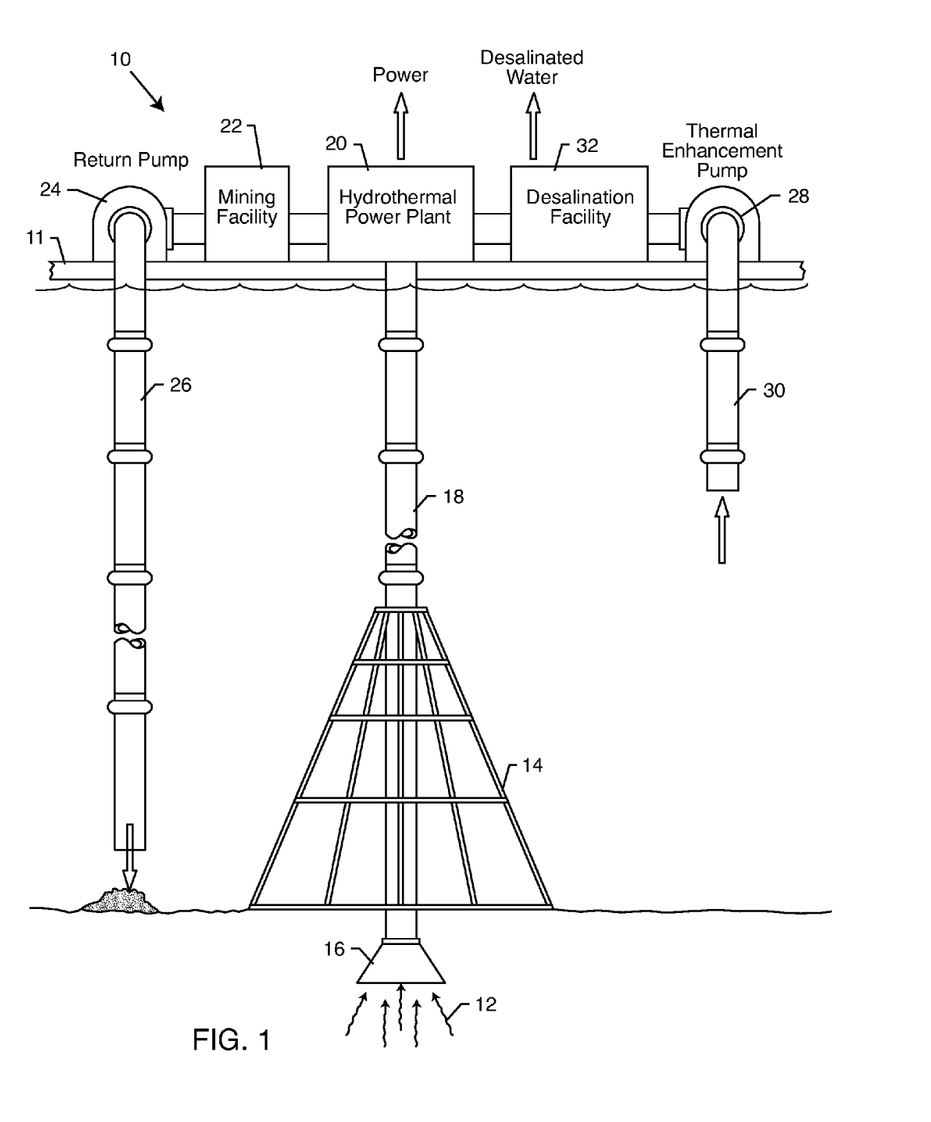
FIG. 1 is a diagrammatic view of a hydrothermal energy and deep-sea resource recovery system which can be incorporated into the present invention.

Such a system 10 is illustrated in FIG. 1. Fluid 12 superheated by the magma is ejected into the ocean and typically its heat energy is then quickly dissipated into the frigid seawater and moved away by ocean currents. The extremely high mineral content is normally precipitated out of the fluid and deposited on the ocean floor surrounding the vent. However, the Marshall system discloses the use of a conically-shaped framework 14 containing a large funnel 16 connected to insulated pipe sections 18. The heated ocean water 12 travels up through the pipe 18 to a hydrothermal power plant 20, where power, such as in the form of electricity, is generated. As the superheated seawater (approximately 400° C. or 750° F.) contains an extremely high mineral content, the system may include a mining facility 22 on the supporting platform 11, which removes valuable minerals and metals before a return pump 24 returns the heated fluid via pipe structure 26 back towards the bottom of the ocean.

The Marshall hydrothermal energy and deep-sea resource recovery system also contemplates pumping seawater via pump 28 and a pipe network 30 to a desalination system 32, which may be powered by means of the hydrothermal power plant 20. More preferably, this may be done by capturing and distilling the steam originating as fluid from the hydrothermal vent into desalinated water, and then further processing it as necessary, such as using system 32, until it can be used for drinking, irrigation purposes, etc. The pump 28 and pipe network 30 may also be used to capture very cold seawater so as to create a greater temperature differential which allows more energy to be extracted from the thermal processes involved, such as in the embodiments described below.

Hydrothermal vents are located at a depth of several thousand feet and can occur anywhere along approximately forty-five thousand miles of Mid-Ocean Ridges, where ocean water can enter the earth's crust and become superheated to several hundred degrees. As illustrated in U.S. patent application Ser. No. 11/890,735, the Marshall Hydrothermal Recovery System can instead circulate a fluid through a generally circular pipe in a closed-loop configuration such that a clean working fluid is superheated when passing in close proximity to the vent, so as to provide thermal energy to the hydrothermal power plant, and then recirculated back into the ocean and across the vent again.

However, there is at least one foreseeable drawback to full implementation of the Marshall Hydrothermal Recovery System, and that lies in delivering the immense power to shore. Undersea cables are complex devices with dozens of layers of wrapping, can take years to build, and are hugely expensive to purchase and lay. They are especially complex when designed for use at the great depths at which hydrothermal vents are found. The enormous energy that can be generated from hydrothermal vents would necessitate the use of several of the largest available undersea cables to carry it to shore, and the demands created by simultaneous construction of several Marshall Hydrothermal Recovery Systems could easily overwhelm worldwide manufacturing capacity for the cable and thereby delay the utilization of hydrothermal energy.

Figures 2, 3, 4:
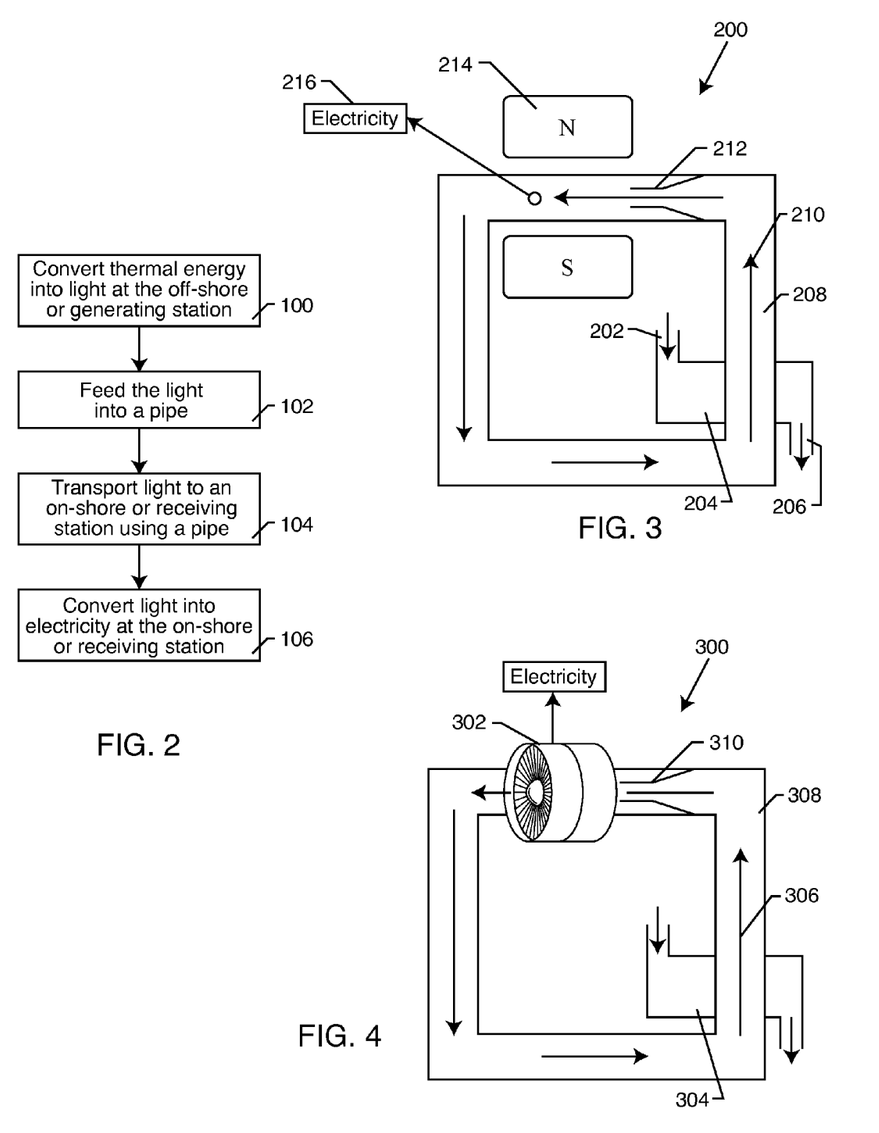
FIG. 2 is a block diagram illustrating the general steps taken in accordance with the present invention.
FIG. 3 is a diagrammatic view of a magnetohydrodynamic device used in connection with the present invention.
FIG. 4 is a diagrammatic view of an electromagnetic generator device, used in connection with the present invention.

With reference to FIG. 2, the system and method for electric power generation and transmission in accordance with the invention essentially consists of four basic systems or steps. Thermal energy is converted into light at the off-shore or generating station (100). The light is then fed into a pipe (102). The light is transported to an on-shore or receiving station using the pipe (104). The light is then converted into electricity at the on-shore or receiving station (106).

The superheated fluid or steam obtained from hydrothermal vents or by any other source or means, can be converted into light energy. Although at some point suitable thermoluminescent material may become available for direct heat to light conversion, with reference to FIG. 2, this typically occurs in two stages, first generating electricity, and second converting the electricity into optical energy. These steps may be done in a variety of ways.

For example, with reference to FIG. 3, a magnetohydrodynamic device or system 200 may be used in which the hydrothermal energy or other thermal energy source is used to create electricity. In the case of the superheated fluid from the ocean vents, this superheated fluid is introduced into an inlet 202 of a heat exchanger device 204 which has an outlet 206 for recirculating the heated fluid. The heat exchanger device 204 is operably associated with a closed loop flow system 208 having a fluid 210 therein which contains magnetic, conductive or charged particles. The fluid may be of such a nature to have known electromagnetic properties, and could even include direct use of the hydrothermal fluid without the heat exchanger if its properties are deemed suitable. Once the fluid 210 is heated, it expands and increases its velocity. This velocity increase may be facilitated by means of a nozzle or jet 212, which forces the fluid at a relatively high velocity through a magnetic field 214, such as created by opposite North and South poles of a magnet 214, which creates electricity 216. The fluid is then circulated past the heat exchanger device 204 again, and the process is repeated.

With reference now to FIG. 4, conventional turbine electromagnetic generator systems, such as the system 300 illustrated in FIG. 4, could also be used to generate electricity. These could take many forms, including passing the superheated fluid directly through an electromagnetic generator device 302. However, in the system illustrated, a heat exchanger 304, similar to that described in relation to FIG. 3, heats a fluid 306 in a closed-loop system 308 such that it is passed through the turbine generator 302. Once again, a nozzle or jet assembly 310 can be used to increase the speed of the fluid through the turbine generator 302. It will also be appreciated that the fluid 306 within the closed-loop system may actually convert to steam when heated, and subsequently become a liquid fluid once again before being reheated by the heat exchanger 304.

Figures 5, 6, 7, 8:
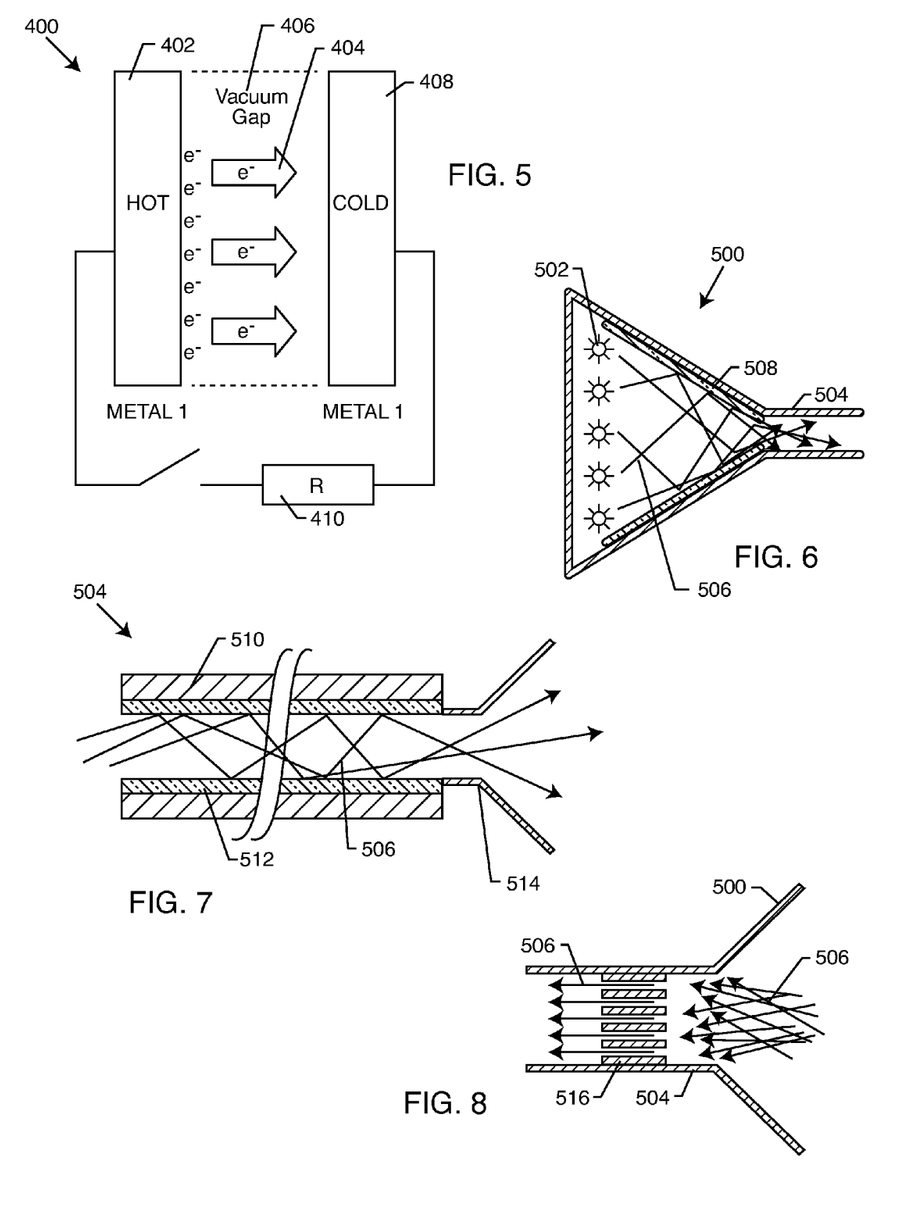
FIG. 5 is a diagrammatic view of a thermionic device used in accordance with the present invention.
FIG. 6 is a cross-sectional and diagrammatic view of a plurality of light generators and a light funnel for directing an optical power beam into a hollow pipe, in accordance with the present invention.
FIG. 7 is a cross-sectional view illustrating the transmission of the optical power beam through the hollow pipe and exiting an opposite end thereof.
FIG. 8 is a cross-sectional and diagrammatic view illustrating the use of a collimator to direct the optical power beam into an end of the hollow pipe, in accordance with the present invention.

With reference now to FIG. 5, in another embodiment of the invention, a thermionic device 400, or an array of thermionic devices 400, is used to convert heat directly into electricity. Such devices operate by means of heating a first portion 402 of the device, which is typically comprised of a metal or other conductive substance. Electrons are emitted from the first heated metal and pass through a vacuum gap 406 to a cooler metal or conductive material 408 such that electricity 410 can be captured. Such systems are known, and sometimes referred to by the trademark Power Chips™ and Thermal Chips™. Moreover, such devices are more fully described in U.S. Pat. No. 7,169,006, the contents of which are incorporated by reference herein.

The aforementioned embodiments and systems are used to convert thermal energy into electricity. Although the present invention is particularly adapted for use in association with a system that recovers superheated fluids from deep-ocean hydrothermal vents, and then uses the superheated fluids as the thermal energy source for generating electrical power or energy, the systems and methods of the present invention can also be applicable to more conventional electricity generating systems. Such systems include electricity generating systems that are based upon nuclear power or the burning of fossil fuels. It is also contemplated that the present invention could use electricity which has already been generated, such as by virtue of hydroelectric dams and the like. The important aspect of the present invention is that a non-optical source of power be converted to an optical source of power. Typically, this is done by utilizing electricity to generate the optical energy. When starting out with thermal energy, this takes two stages, that is the conversion of thermal energy into electricity, which is then converted into optical energy. However, at some point materials and systems may be devised which directly convert heat to light efficiently so as to eliminate the need to convert from thermal energy to electricity as a first step.

The non-optical energy, typically electricity, is then converted into light or optical energy in the form of an optical power beam. This may be done by using florescent light bulbs, conventional light bulbs, light-emitting diodes (which can be either white light or of a particular wave length so as to be a single color), laser, Tesla illumination, magnetron, thermoluminescence, or any other form of electromagnetic radiation. In fact, the term "optical" as used herein is intended to have its broadest definition. "Optical" is used today by photonics engineers and scientists to cover the superset of ultraviolet, visible and infrared regions of the electromagnetic spectrum so as to cover the five decades of wavelength from ultra-violet (0.01 μm wavelength) to the far infrared (1 mm wavelength).

After the optical power beam has been generated, such as by means of light generators 502, it is directed into a hollow pipe 504. FIG. 6 illustrates one possible manner of directing the optical power beams 506 into the hollow pipe 504. This is by means of a light funnel 500 having inner surfaces 508 which are reflective, or which otherwise direct the light beams 506 towards the opening of the hollow pipe 504. Such surface 508 may be polished to a high degree so as to be reflective, or may comprise a mirrored surface.

With reference now to FIG. 7, the hollow pipe 504 is typically comprised of a metal material, but can be comprised of many materials. As such, the hollow pipe 504 includes an outer layer 510 and either an inner layer 512 which is reflective or transmissive, or which comprises a polished surface so as to be reflective. In this manner, the one or more optical power beams 506 can be transmitted along a length of the hollow pipe 504 until they reach an outlet 514 thereof.

Figure 9:
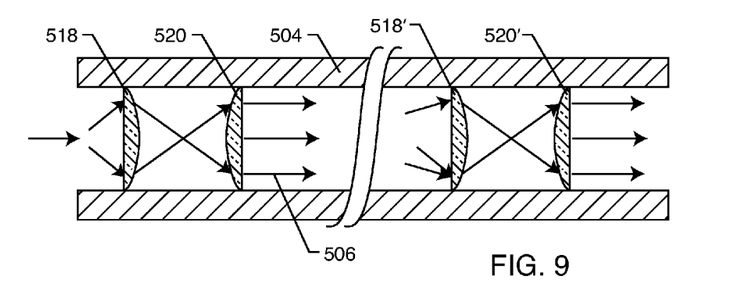
FIG. 9 is a cross-sectional diagrammatic view illustrating the positioning of lenses to redirect and focus the optical power beam through the pipe, in accordance with the present invention.

Instead of an optical funnel 500, such as that illustrated in FIG. 5, an optical wave guide, a beam combiner, or a light collimator 516 may be used to feed the light produced to the light carrier hollow pipe 504, as illustrated in FIG. 8. The use of a collimator 516, as illustrated in FIG. 8, or lenses 518 and 520, as illustrated in FIG. 9, are particularly beneficial in that they can direct the optical power beam 506 in a controlled manner such that reflection off of the inner surface of the hollow pipe 504 is reduced, thus increasing efficiencies and reducing the heat that might otherwise be generated from reflecting the optical beam along the inner surface of the pipe 504. However, even if such collimators 516 or lenses 518 and 520 or the like are not used, burying the hollow pipe 504 either underground or being placed under water would serve to cool any heat generated by reflective losses.

In a particularly preferred embodiment, the hollow pipe 504 is comprised of, or lined with, a metal or highly reflective surface. The hollow pipe 504 is much larger than typical optical fibers or wires made of glass, plastics, or any other transmissive materials. In fact, such hollow pipes 504 can be either from several inches to several feet in diameter, and as such the pipe or pipeline is dimensionally independent of the frequency of the optical power beam. Typically, the hollow pipes 504 will be evacuated of substantially all atmosphere and gasses so as not to impede the transmission of the optical power beam 506. In such case, and when using collimators 516, lenses 518 and 520, or the like, the inner surface of the hollow pipe 504 may not need to be reflective as the optical power beam may be sufficiently controlled so as to be transmitted along the length of the pipe.

However, the hollow pipe 504 need not be evacuated and a vacuum created therein. Instead, an atmosphere can be present which may cause the spreading of the light due to scattering, but either by use of the reflective or transmissive inner surface or the collimators 516 and/or lenses 518 and 520 the optical power beam is still transmitted substantially along the length of the hollow pipe 504. Of course, the collimators 516 and/or lenses 518 and 520 will need to be placed in series and spaced intervals along the length of the hollow pipe 504 to control the transmission of the optical power beam 506.

It is also contemplated that instead of atmosphere, other gasses, such as methane gas, may be transmitted through the hollow pipe 504 such that the hollow pipe 504 is multipurpose in nature. If the optical power beam 506 is of an appropriate wavelength, such as in the visible spectrum, the methane gas, which is colorless and odorless, will not significantly impact the transmitting of the light energy through the pipe 504 any more so than atmospheric air. Moreover, methane gas, which can be a source of power in and of itself, can be transmitted through the pipe 504, such as from the deep sea ocean recovery platform to a land-based system or the like, due to the fact that large amounts of methane gas will be able to be recovered from the deep ocean vents.

Aside from a gas, such as methane gas, being transmitted through the hollow pipe 504, a data signal could be generated by means of data signal generators, which are well known, and transmitted along with the optical power beam 506. Such a data signal would be carried along an optical beam, and in fact the optical power beam 506 could be used, or at least a portion thereof used, to carry and transmit the data signal. Thus, data could be transferred from the optical power beam generating station to the receiving station which can be thousands of yards or even hundreds of miles distant.

The light energy that has been transmitted and received must then be converted into electrical energy for conventional use. This occurs at an on-shore receiving station in the case of the optical energy being generated off-shore in the methodology and system described above, or it can be at a remote receiving end station wherein the optical energy is transmitted over a long overland distance instead of electrical energy being sent through copper cables.

Figure 10:
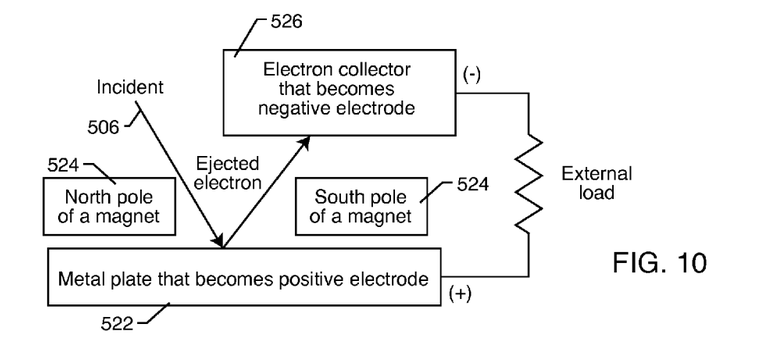
FIG. 10 is a diagrammatic view of an optical beam to electricity converter, used in accordance with the present invention.

In one embodiment, referred to as the photoelectric effect, the light is shined on materials, with appropriate work functions so that the electrons are ejected from the surface of the material by the incident photons. Conventional photovoltaic cells could be used as a converter device to convert the optical power beam to electricity. An alternative photoelectric device or converter is illustrated in FIG. 10, wherein the optical power beam 506 is shined on a metal plate 522 such that it passes through a magnetic field of a magnet 524. The excess photons are converted by the photoelectric effect to electrons which are deflected along a predetermined trajectory by a magnetic field to guide the electrons to another material, in the form of an electron collector 526. The electron collector 526 collects the ejected electrons from the metal plate due to the shining of the optical power beam 506 thereon, and thus becomes a negative electrode. In the process, metal plate 522 becomes a positive electrode, and the now negatively and positively charged electrodes acts as a battery to supply electricity through an external load.

Figure 11:
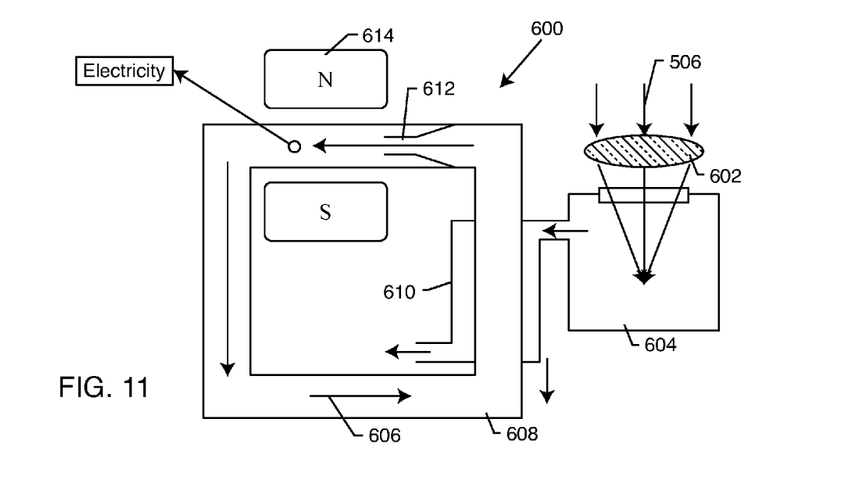
FIG. 11 is a diagrammatic view of another converter in the form of a magnetohydrodynamic device.

In another embodiment, as illustrated in FIG. 11, a magnetohydrodynamic (MHD) device 600 is used. The optical energy 506 can be focused with a lens 602 to heat up a fluid, such as water for producing steam in a steam generator. The steam heats up a conducting fluid 606 in a closed loop 608 using a heat exchanger 610. Alternatively, the light source 506 could be focused directly upon the heat exchanger 610. In either case, the superheated conducting fluid flows through a nozzle 612 to acquire a very high speed, which passes through a magnetic field 614. The interaction of the moving conducting fluid with the magnetic field generates electricity. This is similar to that described above, with the exception that the optical energy is used to generate heat at the MHD conversion system, instead of receiving heat from hydrothermal energy from the ocean vents or from other sources. Of course, the process is in reverse in the sense that at the on-station or remote receiving end station, the optical energy is converted into electricity.

It will also be appreciated that the optical power beam 506 could be converted to electricity by means of heating a fluid, such as water into steam, which would either directly pass through an electromagnetic turbine generator, or heat a fluid in a closed-loop system, similar to that illustrated in FIG. 4, so as to generate the electricity. The process would essentially be similar to that discussed above with respect to FIG. 4, but instead of using a source of thermal energy, the optical power beam or light energy would be used to supply the thermal energy to create the electricity.

Figure 12:
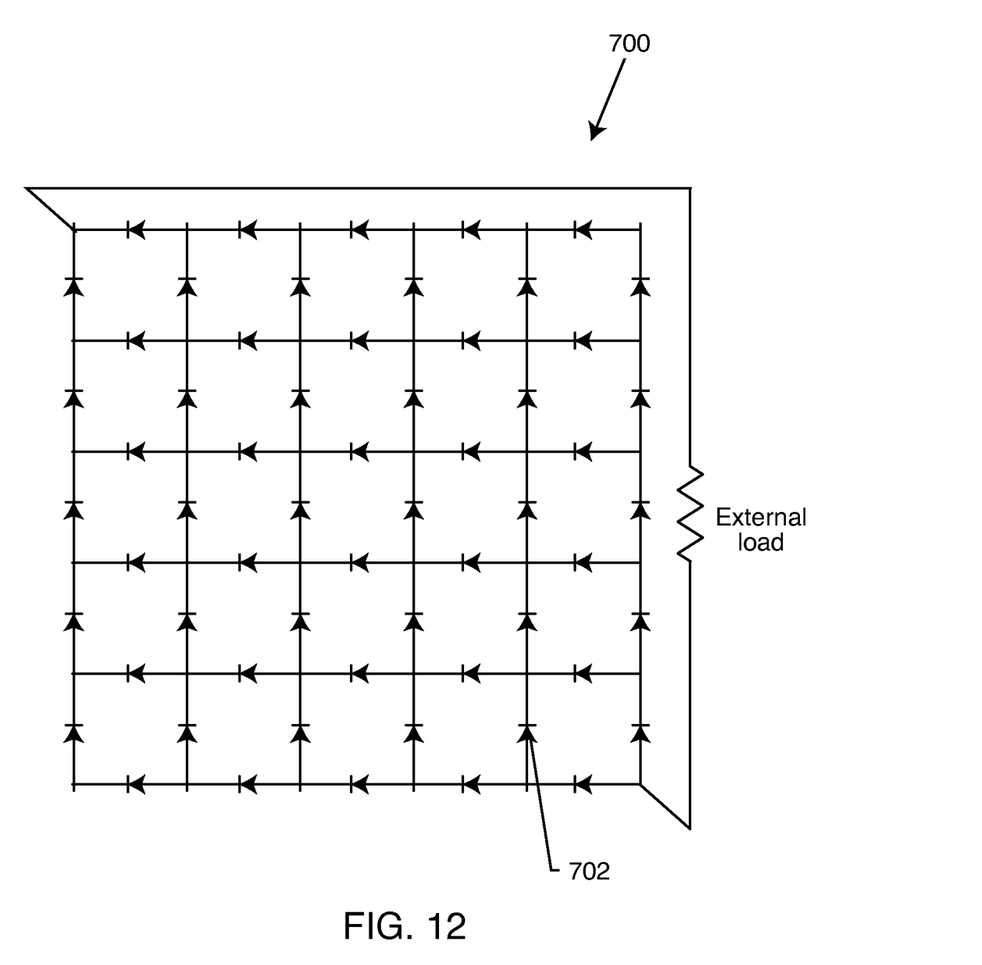
FIG. 12 is a diagrammatic view of a rectenna converter device used in association with the present invention.

With reference now to FIG. 12, yet another methodology for converting the optical energy into electrical energy, which is contemplated by the present invention, is by the use of a rectenna 700. The rectenna 700 usually include elements which are arranged in a multi-element phased array with a mesh pattern reflector element to make it directional. A simple microwave rectenna can be constructed from diodes placed between antenna dipoles. The diodes 702 rectify the current induced in the rectenna by the microwaves. Schottky diodes are often used as they have the lowest voltage drop and highest speed and therefore waste the least amount of power due to conduction and switching. Such rectennas have been proven to be highly efficient at microwave frequencies. More recently, rectennas have been developed to operate at other frequencies. In the case of a microwave rectenna, a tuned antenna is subjected to microwave energy, and a rectifier across the output terminals produces a DC voltage. Theoretically, this concept could be perfected at the frequencies of visible light using the same principles. Thus, the optical energy generated by the invention would be focused on an antenna tuned to those frequencies, and a rectifier or rectifiers would then convert the received energy into a direct current voltage.

If gasses, such as methane gas, were transmitted through the pipe along with the optical energy, such gasses can be recovered at the land-based station. The methane gas could then be applied towards chemical purposes, or be used as its own energy source by burning it or the like. The extraction and collection and processing of the methane gas can be done using conventional systems.

The methodologies for generating and transmitting power described above have many advantages as compared to transmitting electrical power through metallic cables, such as copper cables. Inherent advantages are in its simplicity and far lower cost, and its ability to carry vast amounts of power in a single conduit. Furthermore, no copper is required, and the safety issues associated with high voltage power transmission, as well as the possibility of power interruptions because of lightening strikes, fires, or even terrorist attacks are significantly reduced. As the systems described above have no moving parts, reliability would also be greatly increased. Moreover, when used in conjunction with the thermal powered generating methodology described herein, use of expensive and difficult to lay copper-based undersea cables is eliminated. Implementation is also far easier because of reduced easement restrictions for underground transmission line. It also completely eliminates the need to consider the effects of electromagnetic fields on the environment during the system design phase.

Although several embodiments have been described in detail for purposes of illustration, various modifications may be made without departing from the scope and spirit of the invention. Accordingly, the invention is not to be limited, except as by the appended claims.

What is claimed is:
1. A method for generating, transmitting, and receiving power, comprising the steps of:
    providing a source of non-optical power;
    converting the non-optical power into an optical power beam at a generator station;

providing a hollow pipeline, comprising a hollow pipe or multiple hollow pipes coupled to one another, dimensionally independent of the frequency of the optical power beam;

directing the optical power beam into the hollow pipeline;

transmitting the optical power beam along a length of the pipeline to a receiving station disposed multiple yards to multiple miles from the generator station; and converting the optical power beam into electricity, including using the optical power beam to heat a fluid, and passing the fluid through an electromagnetic generator.

2. The method of claim 1, wherein the providing a source of non-optical power step comprises the step of providing a source of electricity.

3. The method of claim 2, wherein the providing a source of non-optical power step further comprises the step of converting thermal energy into electricity.

4. The method of claim 3, wherein the converting thermal energy into electricity step comprises the step of using magnetohydrodynamics.

5. The method of claim 3, wherein the converting thermal energy into electricity step comprises the step of passing a fluid through an electromagnetic generator device.

6. The method of claim 5, including the step of heating the fluid in a closed-loop system.

7. The method of claim 3, wherein the converting thermal energy into electricity step comprises the step of using a thermionic device.

8. The method of claim 2, wherein the converting the non-optical power into an optical power beam step comprises the step of using the electricity to power a light generator.

9. The method of claim 8, wherein the light generator comprises a light bulb, a laser, fluorescent Tesla illumination, thermoluminescence, magnetron, or a light emitting diode.

10. The method of claim 1, wherein the directing step includes the step of using at least one of: a light funnel, a wave guide, a light collimator, and a beam combiner to direct the optical power beam into an end of the hollow pipe.

11. The method of claim 1, wherein the transmitting step includes the step of providing a hollow pipeline having an inner surface that reflects the optical power beam.

12. The method of claim 1, wherein the transmitting step includes the step of disposing collimators or lenses in spaced relation within the hollow pipeline.

13. The method of claim 1, including the step of generating an optical data signal that is transmitted through the hollow pipeline with the optical power beam.

14. The method of claim 1, including the step of transferring a fluid through the hollow pipeline along with the optical power beam.

15. The method of claim 1, including the step of creating a vacuum in the hollow pipeline.

16. The method of claim 1, wherein the pipeline has an inner diameter of between multiple inches to multiple feet.

17. A method for generating, transmitting, and receiving power, comprising the steps of:

providing a source of non-optical power;

converting the non-optical power into an optical power beam at a generator station;

providing a hollow pipeline, comprising a hollow pipe or multiple hollow pipes coupled to one another, dimensionally independent of the frequency of the optical power beam;

directing the optical power beam into the hollow pipeline;

transmitting the optical power beam along a length of the pipeline to a receiving station disposed multiple yards to multiple miles from the generator station; and converting the optical power beam into electricity, including passing at least a portion of the optical power beam through a magnetic field and onto a metal plate.

18. A method for generating, transmitting, and receiving power, comprising the steps of:

providing a source of non-optical power;

converting the non-optical power into an optical power beam at a generator station;

providing a hollow pipeline, comprising a hollow pipe or multiple hollow pipes coupled to one another, dimensionally independent of the frequency of the optical power beam;

directing the optical power beam into the hollow pipeline;

transmitting the optical power beam along a length of the pipeline to a receiving station disposed multiple yards to multiple miles from the generator station; and converting the optical power beam into electricity, including using the optical power beam to heat a fluid having magnetic, conductive or charged particles, and passing the fluid through a magnetic field.

19. A method for generating, transmitting, and receiving power, comprising the steps of:

providing a source of non-optical power;

converting the non-optical power into an optical power beam at a generator station;

providing a hollow pipeline, comprising a hollow pipe or multiple hollow pipes coupled to one another, dimensionally independent of the frequency of the optical power beam;

directing the optical power beam into the hollow pipeline;

transmitting the optical power beam along a length of the pipeline to a receiving station disposed multiple yards to multiple miles from the generator station; and converting the optical power beam into electricity, including directing the optical power beam onto a rectenna.

* * * * *